(12) United States Patent
Riccardi et al.

(10) Patent No.: US 10,533,114 B2
(45) Date of Patent: Jan. 14, 2020

(54) POLYMERIC FILM COATING METHOD ON A SUBSTRATE BY DEPOSITING AND SUBSEQUENTLY POLYMERIZING A MONOMERIC COMPOSITION BY PLASMA TREATMENT

(71) Applicant: UNIVERSITÀ DEGLI STUDI DI MILANO-BICOCCA, Milan (IT)

(72) Inventors: Claudia Riccardi, Milan (IT); Stefano Zanini, Varedo (IT); Dario Tassetti, Sorisole (IT)

(73) Assignee: UNIVERSITA' DEGLI STUDI MILANO-BICOCCA, Milan (IT)

( * ) Notice: Subject to any disclaimer, the term of this patent is extended or adjusted under 35 U.S.C. 154(b) by 224 days.

(21) Appl. No.: 14/893,256

(22) PCT Filed: May 26, 2014

(86) PCT No.: PCT/IB2014/061726
§ 371 (c)(1),
(2) Date: Nov. 23, 2015

(87) PCT Pub. No.: WO2014/191901
PCT Pub. Date: Dec. 4, 2014

(65) Prior Publication Data
US 2016/0122585 A1 May 5, 2016

(30) Foreign Application Priority Data

May 27, 2013 (IT) .............................. MI2013A0855

(51) Int. Cl.
*C09D 183/06* (2006.01)
*C09D 163/00* (2006.01)
(Continued)

(52) U.S. Cl.
CPC ........... *C09D 183/06* (2013.01); *B05D 3/141* (2013.01); *B05D 3/145* (2013.01); *B05D 3/147* (2013.01);
(Continued)

(58) Field of Classification Search
CPC ............... C08L 63/00–10; C08L 83/06; C09D 163/00–10; C09D 183/06;
(Continued)

(56) References Cited

U.S. PATENT DOCUMENTS 5,580,606 A 12/1996 Kai
6,268,403 B1 7/2001 Crivello
(Continued)

FOREIGN PATENT DOCUMENTS

EP 0412430 A2 2/1991

OTHER PUBLICATIONS

Klages et al., "Surface Functionalization at Atmospheric Pressure by DBD-Based Pulsed Plasma Polymerization," Plasmas and Polymers 5(2), 79-89 (2000).*
(Continued)

*Primary Examiner* — Kregg T Brooks
(74) *Attorney, Agent, or Firm* — Silvia Salvadori, P.C.; Silvia Salvadori

(57) ABSTRACT

The present invention relates to a method for coating a substrate comprising the following steps: a) depositing a polymerizable composition on said substrate, the composition being selected from the following compositions:
a composition (A) containing, as an essential component: a least one epoxy monomer (i) and/or at least one silicone epoxy monomer (ii); or
a composition (B) containing as an essential component a least one silicone epoxy monomer (ii) and at least one monomer containing at least one ethylenic unsaturation
(Continued)

(iii); b) polymerizing said composition by plasma treatment. The coating obtained with this method is substantially free from ionic photocatalysts, and the step (b) is carried out at atmospheric pressure.

10 Claims, 3 Drawing Sheets

(51) Int. Cl.
- *D06M 10/02* (2006.01)
- *D06M 10/08* (2006.01)
- *D06M 10/10* (2006.01)
- *B05D 3/14* (2006.01)
- *C09D 123/00* (2006.01)
- *D06M 15/55* (2006.01)
- *D06M 14/22* (2006.01)
- *D06M 14/28* (2006.01)

(52) U.S. Cl.
CPC ......... *C09D 163/00* (2013.01); *D06M 10/025* (2013.01); *D06M 10/08* (2013.01); *D06M 10/10* (2013.01); *D06M 15/55* (2013.01)

(58) Field of Classification Search
CPC .............. C09J 163/00–10; C09J 183/06; C08J 2363/00–10; C08J 2383/06; B05D 3/141–148; D06M 10/025; D06M 10/08; D06M 10/10; D06M 10/55; D06M 15/55; C08G 59/306; C08G 59/3281
See application file for complete search history.

(56) References Cited

U.S. PATENT DOCUMENTS

| | | | |
|---|---|---|---|
| 2004/0022945 A1* | 2/2004 | Goodwin ................. | B05B 5/00 427/255.27 |
| 2005/0008861 A1* | 1/2005 | Yadav ..................... | C08K 3/08 428/403 |
| 2007/0161308 A1* | 7/2007 | Bourham ............ | D06M 10/025 442/123 |
| 2009/0202739 A1* | 8/2009 | O'Neill .................... | B05D 1/62 427/562 |
| 2013/0084409 A1* | 4/2013 | Vangeneugden ....... | B29C 59/14 427/569 |

OTHER PUBLICATIONS

G. Frens, "Particle Size Stability in Metal Colloids," Kolloid-Z. u. Z. Polymere 250, 736-741 (1972).*
International Preliminary Report on Patentability of PCT/IB2014/061726 dated Oct. 2, 2015.
Morent, R., et all, "Stability study of polyacrylic acid films plasma-polymerized on polypropylene substrates at medium pressure", Applied Surface Science, Elsevier, Amsterdam, NL, vol. 257, No. 2, Nov. 1, 2010, pp. 372-380.
Search Report of PCT/IB2014/061726 dated Sep. 17, 2014.
Written Opinion of the International Preliminary Examining Authority for PCT/IB2014/061726 dated Apr. 27, 2015.

* cited by examiner

Untreated COTTON 2

COTTON 2 with silicone coating

COTTON 2 with silicone coating and TiO$_2$

POLYMERIC FILM COATING METHOD ON A SUBSTRATE BY DEPOSITING AND SUBSEQUENTLY POLYMERIZING A MONOMERIC COMPOSITION BY PLASMA TREATMENT

This application is a U.S. national stage of PCT/IB2014/061726 filed on 26 May 2014, which claims priority to and the benefit of Italian Application No. MI2013A000855 filed on 27 May 2013, the contents of which are incorporated herein by reference in their entireties.

FIELD OF THE INVENTION

The present invention relates to a method for coating a substrate with a polymeric film by deposition and plasma polymerization of a monomer composition.

BACKGROUND ART

In the state of the art, functional coatings on materials are achieved by industrial polymerization processes that consist of multiple processing steps of the material to be coated, including one step of deposition by spreading or spray-coating of precursors containing polymerization initiators and one step of (radical or ionic polymerization) polymerization, that is obtained through thermal or ultraviolet (UV) energy or by electron beam (EB) radiation.

In any case chemical initiators are used, that facilitate polymerization and add stability to the deposit. The use of polymerization initiators is required, for example, for radical polymerization using UV systems and for ionic polymerization using either UV or EB systems. The amount of photoinitiator in the formulation, as a function of the system to be selected, ranges from 0.5 to 15%. Besides being very expensive, photoinitiators are toxic for humans, whereby systems that can polymerize without their assistance are highly desired.

Processes of this type are disclosed, for instance in U.S. Pat. No. 6,268,403 and EP412430.

Furthermore, in case of a radical polymerization process, (thermal, UV or EB) polymerization must occur without oxygen. Oxygen is a strong inhibitor of this type of polymerization, and currently used methods to prevent such contamination include inert atmosphere curing (under nitrogen atmosphere), the use of particular photoinitiators, the use of increased intensity of UV radiation, the use of oxygen scavengers, the use of waxes and shielding films. As far as UV polymerization is concerned, the addition of waxes or other airtight compounds are known to reduce the inhibitory effect of oxygen. In order to improve surface curing in high rate processes, the concept of a barrier against oxygen has been implemented resulting in a technology consisting of applying a gelatin layer containing a high-concentration of initiator on the formulation to be polymerized. Besides preventing diffusion of oxygen from the surrounding environment, this surface layer can provide an additional amount of initiator during UV irradiation. Moreover, since gelatin is not polymerizable under UV irradiation, the layer may be easily removed by water rinsing after curing. The results obtained using wax-based barriers are similar to those obtained in a controlled inert atmosphere of inert gas (e.g. nitrogen).

Alternative methods for surface modification of materials under testing use vacuum or atmospheric-pressure plasmas. Particularly, plasmas can be used to obtain coatings of various thicknesses (of the order of one micron or less) with other functional properties. The material treatment process consists in mixing the gas- or vapor-phase precursor in a gas, typically a noble or inert gas, creating a plasma from such mixture for fragmentation and dissociation of the molecules of the precursors to obtain chemical reactive groups to be deposited on the substrate.

The deposition process is carried out in most cases through a radical polymerization step that requires an oxygen-free environment.

Vacuum processes have the advantage that they are carried out in a controlled-pressure environment and with inert gases with very low oxygen contamination, but use expensive vacuum equipment and chambers in which these treatments may be performed in a roll-to-roll configuration.

At atmospheric pressure the oxygen contamination problem may be obviated by placing the plasma source in an appropriate chamber simulating a closed and controlled environment, in which through-apertures allow continuous material treatment in an oxygen-free environment. Atmospheric plasma is necessarily produced in a mixture of inert or noble gas, typically nitrogen, which acts as a carrier gas of the precursor to be polymerized.

WO 02/28548 discloses a method of depositing functional coatings by combining an atmospheric-pressure discharge plasma and an atomized precursor. This will allow deposition of a series of coatings, that preserve most of the functionality of the monomer being used.

WO 2003/085693 discloses an atmospheric pressure plasma process, in which a process gas and an atomized precursor are introduced into the plasma region between the electrodes.

U.S. Pat. No. 8,178,168 discloses a method for depositing polymeric coatings, wherein a mixture containing a radically polymerizable monomer and a radical initiator undergo an atmospheric pressure plasma treatment and the resulting polymeric coating is deposited on a substrate. The plasma is preferably generated by inert gases (argon, helium) or mixtures thereof with other gases (air, nitrogen, oxygen, ammonia, water vapor). The substrate may be previously activated by means of another atmospheric pressure plasma treatment.

The possibility of depositing functional coatings on various substrates through multi-step processes (low-pressure plasma pre-activation—monomer impregnation—low-pressure plasma treatment) is well documented in literature. See for instance the following scientific publications: M. J. Tszfack et al, Surface & Coating Technology 200 (2006) 3503-3510. All plasma treatments are conducted in closed low-pressure chambers, using inert gases, and hence under very low oxygen-contamination conditions.

Similar procedures are also carried out using atmospheric pressure plasma treatments (see for instance C. Chaiwong et al., Surface & Coating Technology 204 (2010) 2991-2995). Nevertheless, also in this case the gas that is used to produce the plasma shall be an inert or noble gas, to avoid the presence of oxygen, which would inhibit the radical polymerization process.

"Stability Study of Polyacrylic Acid Films Plasma Polymerized on Polypropylene Substrate at Medium Pressure" vol. 257 No. 2, 1 Nov. 2010 pages 372-380 Applied Surface Science Elsevier Amsterdam NL, describes a process for coating a product for biomedical use by polymerization of acrylic acid with inert gas at a pressure close to atmospheric pressure.

On the other hand, WO 2003/089479 discloses a method for coating a substrate by deposition of a monomer composition containing a mixture of ionically and/or radically polymerizable monomers and successive plasma treatment.

Nevertheless, this process requires the presence of a radical photocatalyst, if polymerization occurs by a radical mechanism and a ionic catalyst if polymerization occurs by a ionic mechanism, and such components have already been mentioned to contaminate the coating and the final coated material. Furthermore, also in this process plasma treatment is conducted under vacuum or with inert gases.

U.S. Pat. No. 5,580,606 discloses a process for coating a substrate made of a plastic material, comprising the following steps:
 a) deposition of a polymerizable composition on said plastic material, the composition containing a silane with methacryloxy or vinyl functional groups, and a polyfunctional epoxy compound as well as a curing agent, with the use of photocatalysts;
 b) vacuum plasma treatment (0.1-0.14 mbar).

Therefore, the need exists for a substantially photocatalyst-free process for coating a substrate with a polymeric film.

Also, the need exists for a process for coating a substrate with a polymeric film that is substantially simple, easily scalable and suitable for application in continuous industrial coating processes.

SUMMARY OF THE INVENTION

The applicant surprisingly found a process that is unaffected by the above prior art problems.

Therefore the present invention relates to a method of coating a substrate comprising the following steps:
 a) depositing a polymerizable composition selected from the following compositions:
  a composition (A) containing, as an essential component: a least one epoxy monomer (i) and/or one silicone epoxy monomer (ii);
  a composition (B) containing as an essential component a least one silicone epoxy monomer (ii) and at least one monomer containing at least one ethylene unsaturation (iii);
 b) polymerizing said composition by plasma treatment at a pressure ranging from 0.5 to 3 atm.

The coating obtained with this method is substantially free from ionic photocatalysts.

The applicant also surprisingly found that the method of the present invention may also be carried out in plasma in the presence of air.

DETAILED DESCRIPTION OF THE INVENTION

Figure 1:
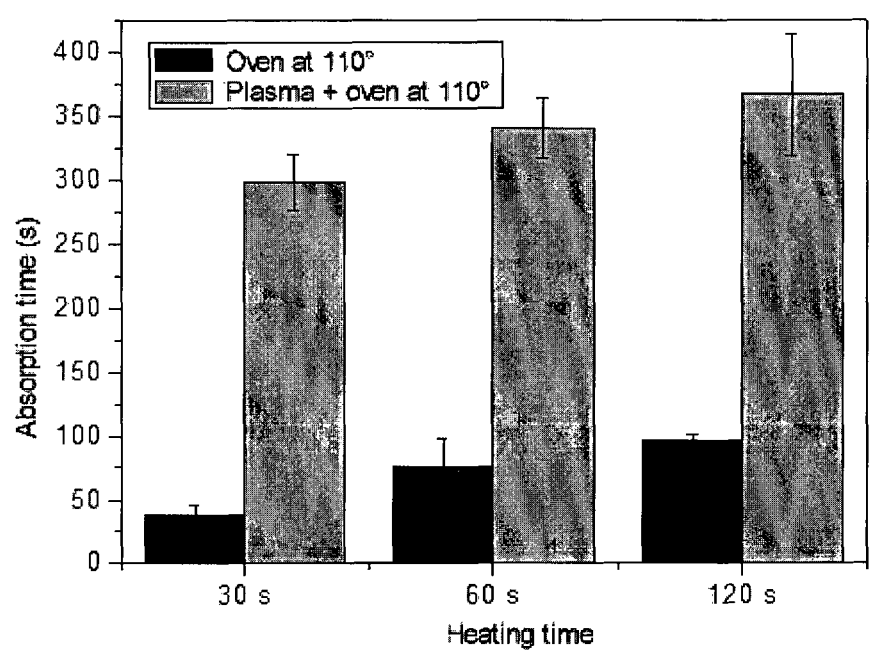
FIG. 1 shows the time of absorption of 50-microliter water drops on the untreated and heated material coated with the composition of Example 9, as a function of the heating time and on the material coated with the same composition and coated with the plasma treatment method of the present invention.
Figure 2:
FIG. 2 shows a 1498× picture (magnified 1498 times) by electron scanning microscopy of the substrate (cotton 2) before coating with the method of the present invention, as described in Example 16.
Figure 3:
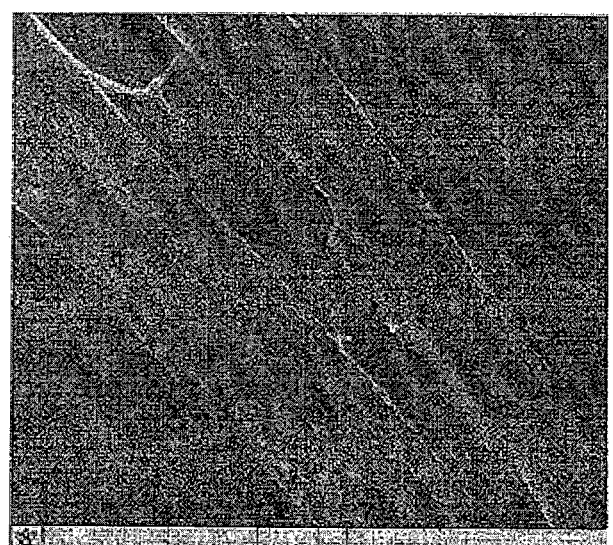
FIG. 3 shows a 2620× picture of the substrate (cotton 2) coated with the method of the present invention and prepared as described in Example 16, by polymerization of an epoxy silicone (ii)
Figure 4:
FIG. 4 shows a 2519× picture of the substrate (cotton 2) coated with the method of the present invention and prepared as described in Example 16, by polymerization of an epoxy silicone with embedded titanium dioxide nanoparticles.

As used herein, the term "polymerization" is intended to designate polymerization of a monomer, such as the monomer of type (i) or the monomer of type (iii) or crosslinking of a polymer/oligomer such as the one that occurs using the monomer of type (ii).

As used herein, the term "monomer" is intended to designate both a real monomer and an oligomer/polymer that can further polymerize.

As used herein, the term "the composition (A)/(B) contains as an essential component" is intended to specify that the composition as used in the method of the present invention requires no further essential components for further polymerization other than the monomers of type (i) and (ii) for the composition (A) and the monomers of types (ii) and (iii) for the composition (B), unlike the case of WO 2003/089479 in which at least polymerization photocatalysts are essentially required.

This definition is consistently confirmed in the comparative tests as described herein, in which the method of the invention, that is carried out without using photocatalysts, provides coatings whose properties are similar and in certain cases better than those obtained with the use of photocatalysts.

As used herein, the term ionic photocatalysts is intended to designate, for instance, iodonium salts.

Therefore, the present invention relates to a coated substrate obtained by deposition and later plasma polymerization on said substrate of a composition (A) or (B) which is substantially free from ionic photocatalysts and preferably also from radical photocatalysts, such as phenones and derivatives thereof, benzophenones and derivatives thereof, thioxanthone and derivatives thereof, etc.

As used herein, the term "substantially free" is intended to indicate that the above mentioned coating has an amount of a ionic photocatalyst and possibly also of a radical photocatalyst that is, for each of them, less than 5000 ppm (0.5%), preferably less than 1000 ppm, more preferably less than 500 ppm and even more preferably less than 100 ppm by weight, based on the total weight of the coating of said substrate, and is preferably totally free of photocatalysts for ionic polymerization.

The composition (A) or (B) in the step (a) of the method of the present invention is preferably in liquid form, e.g. in the form of a pure monomer, as it is (or a mixture of pure monomers without solvents), or in the form of a solution/suspension.

In case the composition (A) or (B) is either as a pure monomer or as a mixture of monomers, the method of the present invention requires application of the monomer or mixture of monomers, possibly preheated, to increase spreadability/wettability thereof on the substrate to be coated.

As mentioned above, the monomer composition (A) or (B) may be applied in the form of a solution or a suspension in a solvent, which may be an organic solvent or a mixture of water and one or more water-soluble organic solvents. The solvent must be sufficiently volatile to allow removal thereof by evaporation in the final phases. Appropriate solvents include, for instance, ketones (methyl ethyl ketone, isobutyl methyl ketone, etc.,) ethers (dioxane, tetrahydrofuran, 1,2 dimethoxy ethane), esters (ethyl acetate, propyl acetate), alcohols (isopropanol), alkoxy alcohols (2-methoxy ethanol, 2-ethoxy ethanol, 1-methoxy-2 propanol), or mixtures of these solvents with water.

Alternatively, simple water may be used as a solvent, possibly with the addition of suitable surfactants.

Preferably alcohols are used, and more preferably isopropanol is used.

The composition may be deposited using a number of techniques, such as: spin coating, dipping, knife coating, brush coating, spraying, electrostatic spraying, atomization, vaporization and reverse roll coating, electrophoresis.

All these techniques may involve the use of rollers or rotors and squeezing and/or drying processes. The composition may be deposited, using any of the above listed techniques, at a temperature other than ambient temperature, e.g. at temperatures ranging from 0° C. to 150° C., with the composition and/or the deposition apparatus being maintained at the selected temperature.

The composition may be deposited through multiple steps, e.g. using the above mentioned techniques and/or combinations thereof to obtain different types of coatings, possibly comprising multiple layers.

Also, by mixing different phases, micrometric, submicrometric and nanometric particles may be deposited.

Preferably, the composition is deposited by a spray technique, using nebulizers, vaporizers, pneumatic atomizers or pressure atomizers or ultrasonic or vibrating atomizers.

Alternatively, fluid-bed technologies may be used for deposition of fluids containing particles having various compositions (dyes, conductors, semiconductors, etc.).

It was also surprisingly found that polymerization, i.e. the step (b) of the method of the present invention may be carried out in air, and hence in plants that do not include apparatus and/or lines for vacuum treatment and/or inert materials.

Step (b) may be carried out using various types of plasma sources, such as dielectric barrier discharge (DBD), surface dielectric barrier discharge (SDBD), Corona, Glow Discharge, Plasma Jet, remote plasmas (with the plasma being generated in a given area and later extracted therefrom by means of directed gas flows and/or by pressure difference and/or by magnetic fields and/or by Micro-Hollow discharges, in which a series of closely packed hollow tubes acting as Radio-Frequency RF or ground, are used to generate a plasma), microwaves.

These types of sources may be used both for restricted areas and for large areas.

Various positions may be envisaged for the support to be coated with the monomer composition, relative to the plasma sources designed for polymerization thereof, such that:

the above mentioned types of sources have at least one plasma generating electrode (SDBD) or multiple electrodes (DBD), and the distance of the monomer composition from the electrode/s ranges from 0 to 3 cm, or such sources have multiple coplanar electrodes between which plasma is generated and the monomer composition, preferably parallel thereto, is placed at a distance ranging from 0 to 3 cm. One or each electrode may be coated with a dielectric material. One or more electrodes may be either grounded or floating. At least one of them is powered with voltages and currents covering frequencies from Direct Current (DC) to microwaves. In the configuration that involves direct contact between the material and the electrodes, the material must have a resistivity that exceeds the resistivity of the plasma-state gas;

the support with the monomer composition must be in a configuration adapted to receive a plasma jet extracted from a region in which it is generated. In this case the material is at a distance from such region that ranges from a few mm to 15 cm, preferably from 0.5 to 10 cm.

Preferably, DBD is used as a plasma source. The plasma treatment temperatures as used in the coating method of the present invention are typical cold plasma temperatures. The operating frequencies of the above mentioned types of plasma generators, as stated above, may range from typical Direct Current (DC) frequencies to microwaves, and hence they can reach the maximum value of $10^6$ MHz. More preferably the range is from 300 Hz to $10^5$ MHz, even better from $10^3$ Hz to $10^4$ MHz. For DBD generators, optimal frequencies range from 0.5 kHz to 1 MHz. The Direct Current (DC) source may be a direct current or pulse-current. In any case, in the method of the invention, plasma may also be triggered by cyclotron resonance frequencies generators. Operating pressures range from 0.5 atm to 3 atm. Particularly, the ideal operating conditions range from 90% to 150% the ambient pressure. Finally, operating pressures generally range from 1 W/cm to 500 W/cm, preferably from 10 W/cm to 300W/cm.

In case of use of a Plasma Jet source including plasma needle and plasma blaster, the operating power range from 10 W/cm to 2000 W/cm, the operating frequencies range from DC to Radio Frequency.

The operating temperature in step (b) is preferably lower than 150° C., more preferably step (b) is carried out at room temperature.

In a preferred embodiment, the method for coating a substrate of the present invention may include, before step (a), a plasma treatment of the substrate to be coated, to increase wettability of the substrate and uniformity of the coating and/or adhesion of the coating to the surface of the substrate.

With the method of the present invention various surface properties deriving from the particular monomer or mixtures of monomers in use are imparted to the substrate to be coated. These properties (such as water repellency, hydrophilicity, oil repellency, etc.) may be imparted separately or in combination (multifunctionality) such as water repellency associated with oil repellency.

Epoxy monomers of type (i) are preferably selected from: glycidol, styrene oxide, butadiene oxide, ethylene glycol diglycidyl ether, glycidyl methacrylate, bisfenol A diglycidyl ether (and its oligomers), 1,2 epoxy dodecane, glycerol diglycidyl ether, 1,4 butandiol-diglycidyl ether, 1,3 diglycidyl glyceryl ether, glycidyl octafluoropentyl ether, propylene oxide, glycidyl methyl ether, glycidyl butyrate, cyclohexene oxide, epoxy octane, glycidyl tosylate, diepoxy octane, furfuryl glycidyl ether, (2,2,3,3,4,4,5,5,6,6,7,7,8,8, 9,9,9-heptadecafluorononyl) oxirane. The above mentioned epoxy monomers of type (i), which contain a hydroxyl group in addition to the epoxy group, can impart hydrophilicity, whereas those that dot contain such hydrophilic groups can only substantially impart water repellency.

The silicone epoxy monomer of type (ii) can impart water repellency.

The monomer of type (ii) may be selected from a low-molecular weight and preferably low-viscosity silicone epoxy monomer, such as 2-(3,4-epoxy cyclohexyl)-ethyl triethoxysilane or 2-(3,4-epoxy cyclohexyl)-ethyl trimethoxysilane or a $C_1$-$C_4$-alkyl siloxane oligomer/polymer terminated and/or substituted with at least one $C_1$-$C_6$ alkylene-($C_5$-$C_6$-cycloalkylene)-epoxy residue, and more preferably this type of monomer is characterized by the following formulas (I)-(VII)

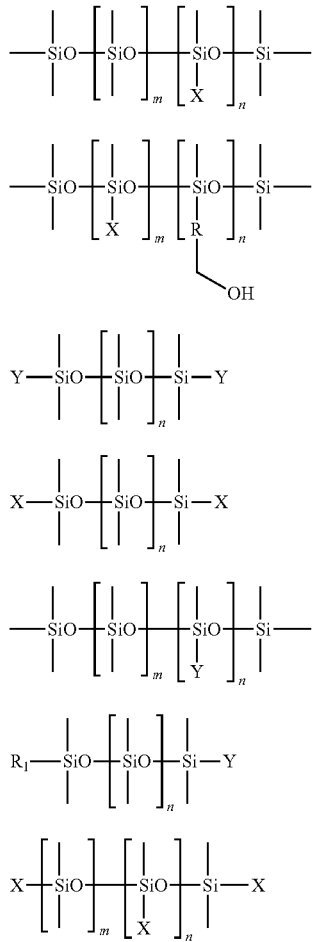

wherein m is an integer ranging from 2 to 100, n is an integer ranging from 2 to 10, R is a $C_1$-$C_6$ bivalent alkylene residue, $R^1$ is a $C_1$-$C_{10}$ monovalent alkyl residue.

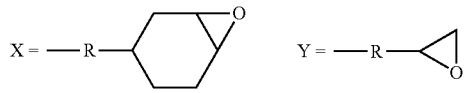

However, the applicant found, as mentioned above, that this class of epoxy monomers (ii), like non-silicone epoxy monomers of type (i), when used in the method of the present invention, do not need the above mentioned ionic photocatalysts.

The applicant also surprisingly found that the method of the invention allows polymerization of monomers containing at least one ethylene unsaturation of type (iii) without radical initiators if they are deposited on the substrate in the form of a solution/suspension that contains the silicone epoxy monomers (ii).

The monomers of type (iii) are deposited on the substrate (e.g. by spraying) from a solution in which they are mixed with the silicone compounds (ii), that form a protective layer over the surface of the layer of the monomer (iii). This protective layer can prevent oxygen from reaching acrylic monomers. This will avoid the need of adding initiators and/or catalysts for radical polymerization.

Examples of monomers of type (iii) are acrylic acid and acrylic and methacrylic acid esters, possibly perhalogenated, preferably perfluorinated, vinyl esters, possibly perhalogenated, preferably perfluorinated, vinyl ethers, possibly parhalogenated, preferably perfluorinated, vinyl halides, etc.

Particularly, acrylic and methacrylic acid perfluoroalkyl esters and perfluorovinyl esters and ethers are used to impart oil repellency.

Therefore, the coatings obtained with the composition (B) impart water repellency to the substrate and in certain cases they may also impart oil repellency.

The method of the invention may be also used for the deposition of multifunctional coatings, in which nano- and microparticles are embedded in the plasma-polymerized deposit. The nanoparticles and microparticles may be made of metal or non-metal oxides or consist of metals or non-metals, such as Si and C, or may be organic particles, preferably in the form of nanometric powders with an average particle diameter ranging from 10 nm to 1 micron or in the form of micrometric particles with a diameter ranging from 1 micron to tens of micron. The particles may be compacted, in porous form or in capsule form. Examples of oxides include, for example, silica, titanium dioxide, zirconia, alumina, magnesium oxide, nickel oxide, clays and zeolites. Examples of organic particles include; polypropylene, polyethylene or polystyrene microparticles or mixtures thereof.

In this case, the composition (A) or (B) as used in the method of the invention comprises nanoparticles that can in turn impart special functions to the coating.

The compositions (A) and (B) as used in the coating method of the present invention may possibly contain one or more of the following additives as usually employed in conventional monomer compositions, such as for example: pigments, inorganic fillers, organic and inorganic dyes, UV stabilizers, antioxidants, etc. Commercial monomers of type (ii), available under the trademark TEGO® may contain isopropyl thioxanthone photocatalists.

The method of the present invention may be particularly used with multiple types of materials, such as, for instance: wood, paper, glass, metals, either woven or nonwoven textile materials, which may be artificial, such as polyesters and polyamides, natural, such as cotton, hemp, flax, or mixed, natural and artificial, plastic, ceramic materials, composite materials such as carbon fiber-, glass fiber- and ceramic-reinforced polymeric materials, building and furniture materials, multilayer materials.

The following examples of the method of the invention are described by way of illustration and without limitation.

1) Preliminary Remarks

The specifications of the materials that compose the substrates coated with the method of the present invention will be now set forth:

Definitions of Materials

COTTON 1 (Examples Nos. 1, 6, 8): 100% cotton, basis weight 70 g/m²

COTTON 2 (Examples Nos. 9, 10, 15, 16): 100% cotton, basis weight 125 g/m²

PE (Examples Nos. 7, 14): LDPE (Low-Density Polyethylene), thickness 100 micron

PET fabric (Example No. 2): monofilament woven Polyethylene Terephthalate fabric Yarn diameter 31 micron, mesh size 25 micron.

PET fabric 2 (Examples Nos. 3, 17): monofilament woven Polyethylene Terephthalate fabric Yarn diameter 64 micron, mesh size 35 micron. Monofilament Nylon fabric (Example No. 12): monofilament woven Nylon fabric Yarn diameter 66 micron, mesh size 35 micron.

Paper (Example No. 5): lignocellulosic material, basis weight 120 g/m²

Glass (Example No. 4): thickness 1 mm

80% Nylon-20% Elastan® fabric (Examples Nos. 11, 13).

2. First Part: Analysis of the Effects of the Inventive Method, as Carried Out Both in Nitrogen and in Air (Open Chamber) and Comparison of the Results Obtained thereby with a Similar Process Carried out with the Use of Catalysts.

2-1 Composition (A) with the epoxy silicone monomer (ii) only

EXAMPLE 1

Treatments on Cotton (COTTON 1)

Two cotton fabrics (COTTON 1), 90 cm² each, were pre-activated in atmospheric-pressure air plasma using a DBD planar plasma reactor. Pretreatment was carried out in 4 runs at a speed of 7 m/min and at a linear power density of 20 W/cm. One sample was sprayed with 3 ml of a 30 g/l solution of epoxy silicone (TEGO® RC 1409) in isopropanol using an airbrush. The second sample was sprayed with a solution of 30 g/l epoxy silicone (TEGO®RC1409) in isopropanol containing a photoinitiator (TEGO® PC 1466) in 3% concentration by weight of the epoxy monomer. Finally, the samples underwent atmospheric pressure air plasma treatment using a DBD planar plasma reactor (4 runs at a speed of 7 m/min, linear power density 20 W/cm). After such plasma treatment, the fabrics were heated in an oven at 120° C. for 2 minutes.

The same method was also repeated with nitrogen plasma (used both in pre-activation and in treatment).

The fabrics were characterized by measuring the contact angle and the 50 microliter water drop absorption time. Note that the untreated cotton 1 absorbed a water drop in 2 seconds and had an assumed contact angle of 0 degrees.

| Type of treatment | Absorption time (min) | Absorption time 1 day (min) | Absorption time 4 days (min) |
|---|---|---|---|
| Air with photoinitiator | 38 ± 4 | 33 ± 6 | >120 (evaporates) |
| Air without photoinitiator | 80 ± 10 | >120 (evaporates) | >120 (evaporates) |
| Nitrogen with photoinitiator | >120 (evaporates) | >120 (evaporates) | >120 (evaporates) |
| Nitrogen without photoinitiator | 22 ± 3 | 29 ± 2 | >120 (evaporates) |

| Type of treatment | Contact angle (°) |
|---|---|
| Air with photoinitiator | 145 ± 9 |
| Air without photoinitiator | 150 ± 8 |
| Nitrogen with photoinitiator | 148 ± 4 |
| Nitrogen without photoinitiator | 146 ± 3 |

EXAMPLE 2

Treatments on PET1

Two PET fabrics, 90 cm² each, were pre-activated in atmospheric-pressure air plasma using a DBD planar plasma reactor. Pretreatment was carried out in 4 runs at a speed of 7 m/min and at a linear power density of 20 W/cm. One sample was sprayed with 3 ml of a 30 g/l solution of epoxy silicone (TEGO RC 1409) in isopropanol using an airbrush. The second sample was sprayed with a solution of 30 g/l epoxy silicone (TEGO RC 1409) in isopropanol containing a photoinitiator (TEGO PC 1466) in 3% concentration by weight of the epoxy monomer. Finally, the samples underwent atmospheric pressure air plasma treatment using a DBD planar plasma reactor (4 runs at a speed of 7 m/min, linear power density 20 W/cm).

The fabrics were characterized by contact angle measurement.

| Type of treatment | Contact angle (°) |
|---|---|
| Untreated PET | 120 ± 3 |
| With photoinitiator | 136 ± 2 |
| Without photoinitiator | 135 ± 1 |

EXAMPLE 3

Treatments on PET 2

Two PET fabrics, made of a PET other than the previous one (PET 2), 90 cm² each, were pre-activated in atmospheric-pressure air plasma using a DBD planar plasma reactor. Pretreatment was carried out in 4 runs at a speed of 7 m/min and at a linear power density of 20 W/cm. One sample was sprayed with 3 ml of a 30 g/l solution of epoxy silicone (TEGO®RC 1409) in isopropanol using an airbrush. The second sample was sprayed with a solution of 30 g/l epoxy silicone (TEGO® RC 1409) in isopropanol containing a photoinitiator (TEGO® PC 1466) in 3% concentration by weight of the epoxy monomer. Finally, the samples underwent atmospheric pressure air plasma treatment using a DBD planar plasma reactor (4 runs at a speed of 7 m/min, linear power density 20 W/cm). After such plasma treatment, the fabrics were heated in an oven at 120° C. for 2 minutes.

The same was also repeated with nitrogen plasma (used both in pre-activation and in treatment).

The fabrics were characterized by contact angle measurement.

| Type of treatment | Contact angle (°) |
|---|---|
| Untreated PET 2 | 95 ± 1 |
| Air with photoinitiator | 130 ± 4 |
| Air without photoinitiator | 134 ± 2 |
| Nitrogen with photoinitiator | 126 ± 1 |
| Nitrogen without photoinitiator | 128 ± 3 |

EXAMPLE 4

Treatments on Glass

Two glass panes were pre-activated in atmospheric-pressure air plasma using a DBD planar plasma reactor. Pretreatment was carried out in 4 runs at a speed of 7 m/min and at a linear power density of 20 W/cm. One sample was sprayed with a solution of 5 g/l epoxy silicone (TEGO® RC 1409) in isopropanol. The second sample was sprayed with a solution of 5 g/l epoxy silicone (TEGO ® RC 1409) in isopropanol containing a photoinitiator (TEGO® PC 1466) in 3% concentration by weight of the epoxy monomer. Finally, the samples underwent atmospheric pressure air plasma treatment using a DBD planar plasma reactor (2 runs at a speed of 7 m/min, linear power density 20 W/cm). Characterization was carried out by contact angle measurement. A glass sample simply sprayed with a 5 g/l solution of epoxy silicone (TEGO® RC 1409) was also prepared for comparison.

| Sample | Contact angle (°) |
|---|---|
| Untreated glass | 24 ± 2 |
| Treated with air and photoinitiator | 105 ± 2 |
| Treated with air without photoinitiator | 101 ± 1 |
| Only sprayed without photoiniziator | 30 ± 3 |

EXAMPLE 5

Treatments on Paper

Two paper samples were pre-activated in atmospheric-pressure air plasma using a DBD planar plasma reactor. Pretreatment was carried out in 4 runs at a speed of 7 m/min and at a linear power density of 20 W/cm. One sample was sprayed with 3 ml of a 30 g/l solution of epoxy silicone (TEGO® RC 1409) in isopropanol using an airbrush. The second sample was sprayed with a solution of 30 g/l epoxy silicone (TEGO RC 1409) in isopropanol containing a photoinitiator (TEGO® PC 1466) in 3% concentration by weight of the epoxy monomer. Finally, the samples underwent atmospheric pressure air plasma treatment using a DBD planar plasma reactor (4 runs at a speed of 7 m/min, linear power density 20 W/cm).

Characterization was carried out by measuring the contact angle and the 50 microliter water drop absorption time.

| Sample | Absorption time (min) | Contact angle (°) |
|---|---|---|
| Untreated paper | Instantaneous | 0 |
| Paper treated with photoinitiator | 13 | 119 ± 6 |
| Paper treated without photoinitiator | 82 | 126 ± 1 |

The Examples 1-4, which use the composition (A) with a silicone epoxy monomer of type (ii) show that:
the method of the invention, which is carried out without using a ionic photoinitiator, is as effective as or more effective than a similar process that uses a photocatalyst.
This is confirmed both in nitrogen and in air, i.e. in an open-chamber process.
2-1 Composition (A) with the epoxy monomer (i) only

EXAMPLE 6

Treatments on Cotton with epoxy dodecane (COTTON 1)

Two cotton fabrics (COTTON 1), 90 cm² each, were pre-activated in atmospheric-pressure air plasma using a DBD planar plasma reactor. Pretreatment was carried out in 4 runs at a speed of 7 m/min and at a linear power density of 20 W/cm. One sample was sprayed with 3 ml of a solution of 10 g/l epoxy dodecane in isopropanol using an airbrush. The second sample was sprayed with a solution of 10 g/l epoxy dodecane in isopropanol containing a photoinitiator (TEGO®PC 1466) in 3% concentration by weight of the epoxy monomer. Finally, the samples underwent atmospheric pressure air plasma treatment using a DBD planar plasma reactor (4 runs at a speed of 7 m/min, linear power density 20 W/cm). After such plasma treatment, the fabrics were heated in an oven at 120° C. for 1 minute.

The same method was also repeated with nitrogen plasma (used both in pre-activation and in treatment).

The fabrics were characterized by measuring the contact angle and the 50 microliter water drop absorption time.

A sample simply sprayed with 3 ml of a 10 g/l solution of epoxy dodecane in isopropanol was also prepared for comparison, and heated in an oven at 120° C. for 1 minute.

| Type of treatment | Absorption time (min) |
|---|---|
| Air with photoinitiator | 4 |
| Air without photoinitiator | 7 |
| Nitrogen with photoinitiator | 3 |
| Nitrogen without photoinitiator | 14 |
| Only sprayed and heated | 2 |

This example shows that the method of the present invention, which is carried out without using a ionic photoinitiator, is as effective as or more effective than a similar process that uses a ionic photoinitiator. This is confirmed both in nitrogen atmosphere and in air, even in open-chamber processes.

EXAMPLE 7

Treatments on PE With gycerol diglycidyl ether

Two PE films were pre-activated in atmospheric-pressure air plasma using a DBD planar plasma reactor. Pretreatment was carried out in 4 runs at a speed of 7 m/min and at a linear power density of 20 W/cm. One sample was sprayed with a solution of 10 g/l gycerol diglycidyl ether in isopropanol. The second sample was sprayed with a solution of 10 g/l gycerol diglycidyl ether in isopropanol containing a photoinitiator (TEGO® PC1466) in 3% concentration by weight of the epoxy monomer. Finally, the samples underwent atmospheric pressure air plasma treatment using a DBD planar plasma reactor (4 runs at a speed of 7 m/min, linear power density 20 W/cm).

The same was also repeated with nitrogen plasma (used both in pre-activation and in treatment).

Characterization was carried out by contact angle measurement.

Films were also prepared for comparison, that were only pre-activated, only sprayed with a 10 g/l solution of glycerol diglycidyl ether in isopropanol (with and without photoinitiator), pre-activated and sprayed with a 10 g/l solution of glycerol diglycidyl ether in isopropanol (with and without photoinitiator).

| Sample | Contact angle (°) |
| --- | --- |
| Untreated PE | 90 ± 1 |
| Air with photoinitiator | 25 ± 2 |
| Air without photoinitiator | 20 ± 2 |
| Nitrogen without photoiniziator | 17 ± 1 |
| Only sprayed without photoinitiator | 86 ± 2 |
| Only sprayed with photoinitiator | 72 ± 5 |
| Only pre-activated | 41 ± 5 |
| Pre-activated and sprayed without photoinitiator | 29 ± 1 |

This example shows that the method of the present invention, which is carried out without using a ionic photoiniziator, is as effective as or more effective than a similar process that uses a ionic photoinitiator. This is confirmed both in nitrogen atmosphere and in air, even in open-chamber processes.

3. Second Part: Modification of Surface Properties with the Method of the Invention, as Carried out in Air (Open Chamber) with the Composition (a), with the Composition (b), with the Composition (a) Containing Titanium Dioxide Particles.

3.1 Modification of Surface Properties with the Method of the Invention, when Carried out in Air (Open Chamber) with the Composition (A) Containing the Monomer (Ii)

EXAMPLE 8

Preparation of Water Repellent Cotton Fabrics (COTTON 1)

One cotton fabric (COTTON 1), 90 cm$^2$, was pretreated in atmospheric-pressure air plasma using a DBD planar plasma reactor. Pretreatment was carried out in 4 runs at a speed of 7 m/min and at a linear power density of 20 W/cm. 3 ml of a 30 g/l solution of epoxy silicone (TEGO® RC 1403) in isopropanol were sprayed on the pretreated sample using an airbrush. Then, the sample underwent a new atmospheric-pressure air plasma treatment using a DBD planar plasma reactor (4 runs at a speed of 7 m/min, linear power density 20 W/cm). A cotton sample that was simply sprayed with 3 ml of a solution of epoxy silicone in isopropanol and a cotton sample pretreated (4 runs at a speed of 7 m/min, linear power density 20 W/cm) and sprayed with 3 ml of a solution of epoxy silicone in isopropanol were also prepared for comparison. The fabrics were characterized by measuring the 50 microliter water drop absorption time and contact angle. The results are shown in the table.

EXAMPLE 9

Preparation of Water Repellent Cotton Fabrics (COTTON 2)

Three cotton fabrics, made of a cotton other than the previous one (COTTON 2), 90 cm$^2$ each, were pre-treated in atmospheric-pressure air plasma using a DBD planar plasma reactor. Pretreatment was carried out in 4 runs at a speed of 7 m/min and at a linear power density of 20 W/cm. The samples were sprayed with 3 ml of a 30 g/l solution of epoxy silicone (TEGO® RC 1403) in isopropanol using an airbrush. Finally, the samples underwent atmospheric pressure air plasma treatment using a DBD planar plasma reactor (4 runs at a speed of 7 m/min, linear power density 20 W/cm). After such plasma treatment, the fabrics were heated in an oven at 120° C. for various times (30 seconds, 1 minute, 2 minutes). 3 COTTON 2 samples were also prepared for comparison, which were sprayed with 3 ml of a 30 g/l solution of epoxy silicone (TEGO® RC1403) and heated in an oven without plasma treatment.

The fabrics were characterized by measuring the 50 microliter water drop absorption time. The results are shown in FIG. 1, which indicate that plasma treatments affords improvement of water repellency in modified fabrics, to values considerably higher (5-7 times) than that of fabrics coated with the same type of composition and not treated with plasma.

EXAMPLE 10

Preparation of Water Repellent Cotton Fabrics (COTTON 2)

One cotton fabric (COTTON 2), 90 cm$^2$, was pretreated in atmospheric-pressure air plasma using a DBD planar plasma reactor. Pretreatment was carried out in 4 runs at a speed of 7 m/min and at a linear power density of 20 W/cm. 3 ml of a 10 g/l solution of 1,2-epoxy dodecane in isopropanol were sprayed on the pretreated sample using an airbrush. Then, the sample underwent a new atmospheric-pressure air plasma treatment using a DBD planar plasma reactor (4 runs at a speed of 7 m/min, linear power density 20 W/cm) and was heated in an oven for 5 minutes at 80° C. A cotton sample that was simply sprayed with 3 ml of a solution of 1,2-epoxy dodecane in isopropanol and a cotton sample pretreated (4 runs at a speed of 7 m/min, linear power density 20 W/cm) and sprayed with 3 ml of a solution of 1,2-epoxy dodecane in isopropanol were also prepared for comparison. The fabrics were characterized by measuring the 50 microliter water drop absorption time and contact angle. The results are shown in the table.

| SAMPLE | ABSORPTION TIME (s) | CONTACT ANGLE (°) |
| --- | --- | --- |
| UNTREATED COTTON 1 | 2 | 0 (immediate absorption) |
| SIMPLY SPRAYED COTTON 1 | 2 | 0 (immediate absorption) |
| PRETREATED AND SPRAYED COTTON 1 | 2 | 0 (immediate absorption) |
| PRETREATED-SPRAYED-TREATED COTTON 1 | Drops evaporate without being absorbed | 143 ± 4 |

| SAMPLE | ABSORPTION TIME (s) | CONTACT ANGLE (°) |
| --- | --- | --- |
| UNTREATED COTTON 2 | 2 | 0 (immediate absorption) |
| SIMPLY SPRAYED COTTON 2 | 2 | 0 (immediate absorption) |
| PRETREATED AND SPRAYED COTTON 2 | 2 | 0 (immediate absorption) |
| PRETREATED-SPRAYED-TREATED-OVEN COTTON 2 | Drops evaporate without being absorbed | 126 ± 3 |

EXAMPLE 11

Treatments on 80% nylon-20% elastane Fabric

One nylon (80%) and elastane (20%) fabric, 90 cm², was pre-activated in atmospheric-pressure air plasma using a DBD planar plasma reactor. Pretreatment was carried out in 4 runs at a speed of 7 m/min and at a linear power density of 20 W/cm. The sample was sprayed with 3 ml of a 30 g/l solution of epoxy silicone (TEGO® RC 1409) in isopropanol using an airbrush and then underwent an atmospheric-pressure air plasma treatment using a DBD planar plasma reactor (4 runs at a speed of 7 m/min, linear power density 20 W/cm). After such plasma treatment, the fabric was heated in an oven at 120° C. for 1 minute.

The fabrics were characterized by measuring the 50 microliter water drop absorption time and the contact angle.

| Sample | Absorption time (min) | Contact angle (°) |
| --- | --- | --- |
| Untreated fabric | Instantaneous | 0 |
| Treated fabric | 20 | 138 ± 3 |

EXAMPLE 12

Treatments on monofilament nylon Fabric

One monofilament nylon fabric, 90 cm², was pre-activated in atmospheric-pressure air plasma using a DBD planar plasma reactor. Pretreatment was carried out in 4 runs at a speed of 7 m/min and at a linear power density of 20 W/cm. The sample was sprayed with 3 ml of a 30 g/l solution of epoxy silicone (TEGO® RC 1409) in isopropanol using an airbrush and then underwent an atmospheric-pressure air plasma treatment using a DBD planar plasma reactor (4 runs at a speed of 7 m/min, linear power density 20 W/cm). After such plasma treatment, the fabric was heated in an oven at 120° C. for 1 minute.

The fabric was characterized by contact angle measurement.

| Sample | Contact angle (°) |
| --- | --- |
| Untreated fabric | 112 ± 1 |
| Treated fabric | 129 ± 1 |

3.2 Modification of Surface Properties with the Method of the Invention, when Carried out in Air (Open Chamber) with the Composition (A) Containing the Monomer (i)

EXAMPLE 13

Treatments on 80% nylon-20% elastane® Fabric with epoxy dodecane

One nylon (80%) and Elastane® (20%) fabric, 90 cm², was pre-activated in atmospheric-pressure air plasma using a DBD planar plasma reactor. Pretreatment was carried out in 4 runs at a speed of 7 m/min and at a linear power density of 20 W/cm. The sample was sprayed with 3 ml of a 10 g/l solution of epoxy dodecane in isopropanol using an airbrush and then underwent an atmospheric-pressure air plasma treatment using a DBD planar plasma reactor (4 runs at a speed of 7 m/min, linear power density 20 W/cm). After such plasma treatment, the fabric was heated in an oven at 120° C. for 1 minute.

The fabric was characterized by measuring the 50 microliter water drop absorption time.

| Sample | Absorption time (min) |
| --- | --- |
| Untreated fabric | Instantaneous |
| Treated fabric | 4 |

EXAMPLE 14

Preparation of hydrophilic polyethylene (PE) Films

One LDPE film, 90 cm², was pretreated in atmospheric-pressure air plasma using a DBD planar plasma reactor. Pretreatment was carried out in 4 runs at a speed of 7 m/min and at a linear power density of 20 W/cm. 1 ml of a solution containing glycerol diglycidyl ether (10 g/l) was sprayed on the pretreated sample using an airbrush. Then, the sample underwent a new atmospheric-pressure air plasma treatment using a DBD planar plasma reactor (4 runs at a speed of 7 m/min, linear power density 20 W/cm). The films were characterized by contact angle measurement. The results are shown in the table.

| SAMPLE | CONTACT ANGLE (°) |
| --- | --- |
| UNTREATED PE | 102 ± 5 |
| PRETREATED-SPRAYED-TREATED PE | 20 ± 2 |

EXAMPLE 15

Preparation of Water Repellent and Oil Repellent Cotton Fabrics

One cotton fabric 2, 90 cm², was pretreated in atmospheric-pressure air plasma using a DBD planar plasma reactor. Pretreatment was carried out in 4 runs at a speed of 7 m/min and at a linear power density of 20 W/cm. 3 ml of a solution containing epoxy silicone (5 g/l) and perfluorodecyl acrylate (20 g/l) in isopropanol were sprayed on the pretreated sample using an airbrush. Then, the sample underwent a new atmospheric-pressure air plasma treatment using a DBD planar plasma reactor (4 runs at a speed of 7 m/min, linear power density 20 W/cm). A cotton fabric that was simply sprayed with 3 ml of a solution of epoxy silicone in isopropanol (5 g/l) and perfluorodecyl acrylate/20 g/l) and a cotton fabric pretreated (6 runs at a speed of 2.5 m/min, linear power density 13 W/cm) and sprayed with 3 ml of a solution of epoxy silicone in isopropanol (5 g/l) and perfluorodecyl acrylate (20 g/l) were also prepared for comparison. The fabrics were characterized by measuring the 50 microliter water drop absorption time and the contact angle and by oil repellency assessment using a non-polar test kit (ISO 14 419). The results are shown in the table.

| SAMPLE | WATER ABSORPTION TIME (s) | WATER CONTACT ANGLE (°) | NON-POLAR TEST KIT |
|---|---|---|---|
| UNTREATED COTTON 2 | 2 | 0 (immediate absorption) | 0 |
| SIMPLY SPRAYED COTTON 2 | | | 0 |
| PRETREATED AND SPRAYED COTTON 2 | | | 0 |
| PRETREATED-SPRAYED-TREATED COTTON 2 | Drops evaporate without being absorbed | 135 ± 4 | 5 |

3.3 Modification of Surface Properties With the Method of the Invention, When Carried out in Air (Open Chamber) With the Composition (B)

EXAMPLE 15

Preparation of Water Repellent and Oil Repellent Cotton Fabrics

One cotton fabric 2, 90 cm$^2$, was pretreated in atmospheric-pressure air plasma using a DBD planar plasma reactor. Pretreatment was carried out in 4 runs at a speed of 7 m/min and at a linear power density of 20 W/cm. 3 ml of a solution containing epoxy silicone (5 g/l) and perfluorodecyl acrylate (20 g/l) in isopropanol were sprayed on the pretreated sample using an airbrush. Then, the sample underwent a new atmospheric-pressure air plasma treatment using a DBD planar plasma reactor (4 runs at a speed of 7 m/min, linear power density 20 W/cm). A cotton fabric that was simply sprayed with 3 ml of a solution of epoxy silicone in isopropanol (5 g/l) and perfluorodecyl acrylate /20 g/l) and a cotton fabric pretreated (6 runs at a speed of 2.5 m/min, linear power density 13 W/cm) and sprayed with 3 ml of a solution of epoxy silicone in isopropanol (5 g/l) and perfluorodecyl acrylate (20 g/l) were also prepared for comparison. The fabrics were characterized by measuring the 50 microliter water drop absorption time and the contact angle and by oil repellency assessment using a non-polar test kit (ISO 14 419). The results are shown in the table.

| SAMPLE | WATER ABSORPTION TIME (s) | WATER CONTACT ANGLE (°) | NON-POLAR TEST KIT |
|---|---|---|---|
| UNTREATED COTTON 2 | 2 | 0 (immediate absorption) | 0 |
| SIMPLY SPRAYED COTTON 2 | | | 0 |
| PRETREATED AND SPRAYED COTTON 2 | | | 0 |
| PRETREATED-SPRAYED-TREATED COTTON 2 | Drops evaporate without being absorbed | 135 ± 4 | 5 |

This example shows that the process of the invention may be used to impart both water and oil repellency.

3.4 Modification of Surface Properties with the Method of the Invention, when Carried out in Air (Open Chamber) with the Composition (A) Containing Nanoparticles.

EXAMPLE 16

Deposition of Coatings With Embedded Nanoparticles on Cotton (COTTON 2)

One cotton fabric (COTTON 2), 90 cm$^2$, was pretreated in atmospheric-pressure air plasma using a DBD planar plasma reactor. Pretreatment was carried out in 4 runs at a speed of 7 m/min and at a linear power density of 20 W/cm. 3 ml of a 30 g/l solution of epoxy silicone (TEGO® RC 1403) and 2.5 g/l $TiO_2$ nanoparticles (average nominal diameter 25 nm) in isopropanol were sonicated for 5 minutes and sprayed on the pretreated sample using an airbrush. Then, the sample underwent a new atmospheric-pressure air plasma treatment using a DBD planar plasma reactor (4 runs at a speed of 7 m/min, linear power density 20 W/cm). The fabrics were characterized by scanning electron microscopy (SEM).

EXAMPLE 17

Preparation of Super Water-repellent Polyester Fabrics (PET)

One PET fabric 2, 90 cm$^2$, was pretreated in atmospheric-pressure air plasma using a DBD planar plasma reactor. Pretreatment was carried out in 4 runs at a speed of 7 m/min and at a linear power density of 20 W/cm. 3 ml of a 30 g/l solution of epoxy silicone (TEGO® RC 1403) in isopropanol were sprayed on the pretreated sample using an airbrush. Then, the sample underwent a new atmospheric-pressure air plasma treatment using a DBD planar plasma reactor (4 runs at a speed of 7 m/min, linear power density 20 W/cm). A PET sample was also prepared, that was pretreated, sprayed with 3 ml of a solution of epoxy silicone in isopropanol (30 g/l) and $TiO_2$ nanoparticles (5 g/l) and underwent plasma treatment. The fabrics were characterized by contact angle measurement. The results are shown in the table.

| SAMPLE | CONTACT ANGLE (°) |
|---|---|
| UNTREATED PET | 95 ± 1 |
| PRETREATED-SPRAYED-TREATED PET | 134 ± 2 |
| PRETREATED-$TiO_2$ SPRAYED-TREATED PET | 141 ± 2 |

The embedded nanoparticles lead to a slight increase of the contact angle, due to the resulting nanoroughness.

EXAMPLE 18

Treatments on Cotton (COTTON 1)

Two isopropanol solutions containing two epoxy silicones having different viscosities were prepared, with a total concentration of 20 g/l:
    SOLUTION 1: 55% Poly(dimethylsiloxane), diglycidyl ether terminated+45% Poly[dimethylsiloxane-co-(2-(3,4-epoxy cyclohexyl)ethyl)methylsiloxane];
    SOLUTION 2: 85% Poly(dimethylsiloxane), diglycidyl ether terminated+15% Poly[dimethylsiloxane-co-(2-(3,4-epoxy cyclohexyl)ethyl)methylsiloxane];
It will be appreciated that none of these solutions contained the isopropylthioxanthone (ITX) radical initiator, which is contained in TEGO® epoxy silicones.

Two cotton fabrics (COTTON 1), 100 cm² each, were sprayed with the above described solution 1 and solution 2 respectively. Finally, the samples underwent atmospheric pressure air plasma treatment using a DBD planar plasma reactor (3 runs at a speed of 7 m/min, linear power density 20 W/cm).

Two cotton 1 fabrics that were simply sprayed with the solutions 1 and 2, without undergoing plasma treatment, were also prepared for comparison.

The fabrics were characterized by measuring the 50 microliter water drop absorption time. Note that the untreated cotton 1 absorbed a water drop in 2 seconds.

| Type of treatment | Absorption time | Absorption time 20 days |
|---|---|---|
| Untreated cotton | 2 s | 2 s |
| Only sprayed with solution 1 | 5 s | 5 s |
| Treated with solution 2 | Drops evaporate without being absorbed | Drops evaporate without being absorbed |
| Only sprayed with solution 2 | 5 s | 5 s |
| Treated with solution 2 | 32 min ± 7 min | Drops evaporate without being absorbed |

EXAMPLE 19

Treatments on Cotton (COTTON 1)

A mixture of two epoxy silicones (85% Poly(dimethylsiloxane) diglycidyl ether terminated+15% Poly[dimethylsiloxane-co-(2-(3,4-epoxy cyclohexyl)ethyl)methylsiloxane]) was prepared, with no solvent addition. The mixture so obtained had a viscosity of 25 cP, allowing it to be sprayed using an atomizer. The mixture did not contain isopropylthioxanthone (ITX) as a radical initiator unlike TEGO silicones.

Five cotton fabrics (COTTON 1), 200 cm² each, were sprayed with the above described mixture of epoxy silicones by an atomizer. Finally, the samples underwent atmospheric pressure air plasma treatment using a DBD planar plasma reactor (speed 7 m/min, linear power density 20 W/cm), with different numbers of treatment runs.

The fabrics were characterized by measuring the 20 microliter water drop absorption time. Note that the untreated cotton 1 absorbed a water drop in 2 seconds.

| Type of treatment | Absorption time | Absorption time 20 days |
|---|---|---|
| Only sprayed | 2 s | 2 s |
| 3 runs | 20 s ± 10 s | 14 min ± 5 min |
| 4 runs | 60 s ± 50 s | 64 min ± 7 min |
| 6 runs | 4 min ± 3 min | 47 min ± 7 min |
| 10 runs | 30 min ± 3 min | Drops evaporate without being absorbed |

EXAMPLE 20

Treatments on Plastic Film (PET)

Three isopropanol solutions containing two epoxy silicones having different viscosities were prepared, with a total concentration of 1 g/l:

SOLUTION 1: 100% Poly[dimethylsiloxane-co-(2-(3,4-epoxy cyclohexyl)ethyl)methylsiloxane];
SOLUTION 2: 55% Poly(dimethylsiloxane), diglycidyl ether terminated+45% Poly[dimethylsiloxane-co-(2-(3,4-epoxy cyclohexyl)ethyl)methylsiloxane];
SOLUTION 3: 85% Poly(dimethylsiloxane), diglycidyl ether terminated+15% Poly[dimethylsiloxane-co-(2-(3,4-epoxy cyclohexyl)ethyl)methylsiloxane];

It will be appreciated that none of these three solutions contained the isopropylthioxanthone (ITX) radical initiator, which is contained in TEGO® epoxy silicones.

Three PET films were pre-activated in atmospheric-pressure air plasma using a DBD planar plasma reactor. Pre-treatment was carried out in 4 runs at a speed of 7 m/min and at a linear power density of 18 W/cm. The three samples were sprayed with the above described three solutions (A, B and C) respectively:

PET 1 SAMPLE: sprayed with solution 1;
PET 2 SAMPLE: sprayed with solution 2;
PET 3 SAMPLE: sprayed with solution 3.

Finally, the samples underwent atmospheric pressure air plasma treatment using a DBD planar plasma reactor (one run at a speed of 7 m/min, linear power density 20 W/cm). The characterization was carried out by contact angle measurement immediately after treatment and at different aging times.

| Sample | Contact angle (°) | Contact angle at day 1 (°) | Contact angle at day 7 (°) |
|---|---|---|---|
| Untreated PET | 80 ± 3 | 80 ± 3 | 80 ± 3 |
| PET 1 (solution 1) | 89 ± 2 | 102 ± 1 | 104 ± 2 |
| PET 2 (solution 2) | 91 ± 1 | 97 ± 3 | 98 ± 2 |
| PET 3 (solution 3) | 92 ± 1 | 96 ± 2 | 97 ± 3 |

EXAMPLE 21

Treatments on Plastic Film (PET)

Four PET films were pre-activated in atmospheric-pressure air plasma using a DBD planar plasma reactor. Pre-treatment was carried out in 2 runs at a speed of 7 m/min and at a linear power density of 20 W/cm. The samples were sprayed with a solution of 5 g/l glycerol diglycidyl ether in isopropanol. Finally, the samples underwent atmospheric pressure air plasma treatment using a DBD planar plasma reactor (2 runs at a speed of 7 m/min, with linear power density changing in a range from 4.5 W/cm to 20 W/cm).

Characterization was carried out by contact angle measurement immediately after treatment and at different aging times.

A PET film sample that was only plasma treated (4 runs at a speed of 7 m/min, linear power density 20 W/cm) was also prepared for comparison.

| Sample | Linear power density (W/cm) | Corona dose for treatment (W min/cm²) | Total corona dose (W min/cm²) | Contact angle (°) | Contact angle at day 7 (°) | Contact angle at day 30 (°) |
|---|---|---|---|---|---|---|
| Untreated PET | — | — | — | 80 ± 3 | 80 ± 3 | 80 ± 3 |
| PET 1 | 20 | 600 | 1200 | 55 ± 4 | 60 ± 2 | 65 ± 1 |
| PET 2 | 13.5 | 400 | 1000 | 32 ± 3 | 42 ± 3 | 57 ± 2 |
| PET 3 | 9 | 267 | 867 | 35 ± 4 | 39 ± 1 | 43 ± 1 |

-continued

| Sample | Linear power density (W/cm) | Corona dose for treatment (W min/cm²) | Total corona dose (W min/cm²) | Contact angle (°) | Contact angle at day 7 (°) | Contact angle at day 30 (°) |
|---|---|---|---|---|---|---|
| PET 4 | 4.5 | 133 | 733 | 35 ± 2 | 39 ± 1 | 41 ± 1 |
| Only plasma-treated PET | 20 | 1200 | 1200 | 56 ± 1 | 71 ± 1 | 75 ± 1 |

The invention claimed is:

1. A method for coating a substrate comprising the steps of:
   a) depositing on said substrate a polymerizable composition selected from one of the following compositions:
      a liquid polymerizable composition (A) containing at least one epoxy monomer (i) and/or one silicone epoxy monomer (ii); or
      a liquid polymerizable composition (B) containing at least one silicone epoxy monomer (ii); at least one monomer containing at least one ethylenic unsaturation (iii); and, subsequently, once the depositing step of said polymerizable composition on said substrate is completed,
   b) polymerizing at a pressure ranging from 0.5 to 3 atm said deposited polymerizable composition on said substrate by plasma treatment thereby obtaining a coating on said substrate, said coating being totally free from ionic photocatalyst,
   wherein said step a) is carried out in the absence of plasma; and
   said step b) is carried out in an open chamber and plasma gas is air.

2. The method as claimed in claim 1, wherein said composition (A) or (B) is in the form of a monomer composition as such, or is in the form of a solution in an organic solvent, in an organic solvent-water mixture, or in water added with surfactants.

3. The method as claimed in claim 1, wherein said composition (A) or (B) in step (a) is deposited by spraying.

4. The method as claimed in claim 1, wherein the step (b) is carried out using a dielectric barrier discharge (DBD) source, and the distance of the composition (A) or (B) from the electrodes ranges from 0 to 3 cm.

5. The method as claimed in claim 1, wherein the step (b) is carried out at temperatures below 150° C., at frequencies ranging from 0.5 kHz to 1 MHz, at a pressure ranging from 90% to 150% of ambient pressure, at operating powers ranging from 1 W/cm to 300 W/cm.

6. The method as claimed in claim 1, comprising, before the step (a) a plasma pretreatment of the substrate to be coated.

7. The method as claimed in claim 1, wherein the epoxy monomer (i) contained in the composition (A) is selected from the group consisting of glycidol, glycol, diglycidyl ether, 1,3 diglycidyl glyceryl ether, glycidyl methacrylate, bisphenol A diglycidyl ether, 1,2 epoxy dodecane, glycerol diglycidyl ether, glycidyl octafluoropentyl ether, propylene oxide, glycidyl methyl ether, glycidyl butyrate, epoxy octane, glycidyl tosylate, diepoxy octane, furfuryl glycidyl ether, and (2,2,3,3,4,4,5,5,6,6,7,7,8,8,9,9,9-heptadecafluorononyl) oxirane.

8. The method as claimed in claim 1, wherein the silicone epoxy monomer of type (ii) contained in composition (A) or (B) is selected from a low-molecular weight and low-viscosity epoxy or a $C_1$-$C_4$ alkyl siloxane oligomer/polymer terminated and/or substituted with at least one $C_1$-$C_6$ alkylene-($C_5$-$C_6$-cycloalkylene)-epoxy residue.

9. The method as claimed in claim 1, wherein the monomer (iii) contained in the composition (B) is selected from the group consisting of acrylic and methacrylic acid esters, vinyl esters, vinyl ethers and vinyl halides.

10. The method as claimed in claim 1, wherein the composition (A) or (B) comprises nanoparticles made of metals or nonmetals or metal or nonmetal oxides.

* * * * *